United States Patent
Zeck

(12) 
(10) Patent No.: US 6,668,093 B2
(45) Date of Patent: Dec. 23, 2003

(54) METHOD FOR IMPROVING DICTIONARY-BASED COMPRESSION BY ORDERING RASTER DATA

(75) Inventor: Norman W. Zeck, Webster, NY (US)

(73) Assignee: Xerox Corporation, Stamford, CT (US)

(*) Notice: Subject to any disclaimer, the term of this patent is extended or adjusted under 35 U.S.C. 154(b) by 568 days.

(21) Appl. No.: 09/729,151

(22) Filed: Dec. 4, 2000

(65) Prior Publication Data

US 2002/0101605 A1 Aug. 1, 2002

Related U.S. Application Data

(60) Provisional application No. 60/202,295, filed on May 5, 2000.

(51) Int. Cl.[7] .............................. G06K 9/36; G06K 9/46
(52) U.S. Cl. ....................................... 382/244; 382/233
(58) Field of Search ................................ 382/233, 244, 382/251, 318; 358/426.13; 341/106

(56) References Cited

U.S. PATENT DOCUMENTS

| | | | | |
|---|---|---|---|---|
| 4,136,363 A | * | 1/1979 | Saran | 382/245 |
| 5,353,393 A | * | 10/1994 | Bennett et al. | 345/641 |
| 5,936,605 A | * | 8/1999 | Munjal | 345/102 |
| 5,966,504 A | * | 10/1999 | Sity | 358/1.9 |

* cited by examiner

Primary Examiner—Phuoc Tran
(74) Attorney, Agent, or Firm—Mark Costello; Mark Z. Dudley

(57) ABSTRACT

A method and apparatus for compressing and decompressing electronic documents, with improved compression and reduced history memory size requirements. The method includes receiving scan line ordered raster documents ordering the raster data, and compressing the data with a lossless dictionary compression method. The ordering of raster data into vectors accounts for the correlation of pixel data between scan lines, improving the compression. This ordering also reduces the history window size requirements in a sliding window dictionary compression method.

2 Claims, 2 Drawing Sheets

METHOD FOR IMPROVING DICTIONARY-BASED COMPRESSION BY ORDERING RASTER DATA

This application is based on a provisional application No. 60/202,295, filed May 5, 2000.

In digital systems, documents are often compressed to save storage costs or to reduce transmission time through a transmission channel. Lossless compression can be applied to these documents that can achieve very good compression on regions of document that are computer-rendered, such as characters and graphics. Dictionary-based lossless compression is often used in these cases as these methods adapt well to a variety of input raster data types. Implementation of dictionary compression methods require searching and maintaining a sliding window type of history buffer of previous input data to find the best string match to current input data. For raster data, better matches are often found at scan line intervals in the history buffer. This requires implementations of dictionary-based lossless compression systems to have a large history buffer that has to contain several scan lines. In both software and hardware, implementations increasing the size of this buffer are more expensive in terms of implementation costs or reduced performance. In particular for hardware implementations, this memory is often a specialized memory such as a content addressable memory (CAM) which requires more circuits to implement vs. standard memory that is not content addressable.

Dictionary-based compression methods use the principle of replacing substrings in a data stream with a codeword that identifies that substring in a dictionary. This dictionary can be static if knowledge of the input stream and statistics are known or can be adaptive. Adaptive dictionary schemes are better at handling data streams where the statistics are not known or vary.

Many adaptive dictionary coders are based on two related techniques developed by Ziv and Lempel. The two methods are often referred to as LZ77 (or LZ1) and LZ78 (or LZ2). Both methods use a simple approach to achieve adaptive compression. A substring of text is replaced with a pointer to a location where the string has occurred previously. Thus the dictionary is all or a portion of the input stream that has been processed previously. Using previous strings from the input stream often makes a good choice for the dictionary, as substrings that have occurred will likely reoccur. The other advantage to this scheme is that the dictionary is transmitted essentially at no cost, because the decoder can generate the dictionary from the previously coded input stream. The many variations of LZ coding differ primarily in how pointers are represented and what pointers are allowed to refer to.

LZ1 is a relatively easy to implement version of a dictionary coder. The dictionary in this case is a sliding window containing the previous data from the input stream. The encoder searches this window for the longest match to the current substring in the input stream. Searching can be accelerated by indexing prior substrings with a tree, hash table, or binary search tree. Decoding for LZ1 is very fast: each code word is an array lookup and a length to copy to the output (uncoded) data stream.

In contrast to LZ1, where pointers can refer to any substring in the window of prior data, the LZ2 method places restrictions on which substrings can be referenced. However, LZ2 does not have a window to limit how far back substrings can be referenced. This avoids the inefficiency of having more than one coded representation for the same string that can occur frequently in LZ1.

LZ2 builds the dictionary by matching the current substring from the input stream to a dictionary that is stored. This stored dictionary is adaptively generated based on the contents of the input stream. As each input substring is searched in the dictionary, the longest match will be located, starting at the current symbol in the input stream. So if character "a" were the first part of a substring, then only substrings that started with "a" would be searched. Generally this leads to a good match of input substring to substrings in the dictionary. However, if a substring "bacdef" were in the dictionary, then "acdef" from the input stream would not match this entry since the substring in the dictionary starts with "b". This is different from LZ1, which is allowed to generate a best match anywhere in the window and could generate a pointer to "acdef".

The references described herein and above are incorporated by reference for their teachings.

SUMMARY OF THE INVENTION

In accordance with the invention, there is provided a method and apparatus for compressing and decompressing electronic documents, with improved compression and reduced requirements on the size of the history buffer.

In accordance with one aspect of the invention, there is provided a method pre-ordering raster data into a vector of pixels. The specific ordering of this vector of pixels takes advantage of correlation of pixel data at scan line intervals. The pre-ordering of raster data by this specific method results in improved compression and reduces size requirements of the history buffer that has to be searched.

In accordance with another aspect of the invention, there is provided a method of compressing raster image comprising: receiving scan ordered raster data; ordering the raster data into a vector of pixels that are taken from several scan lines; and compressing the resulting vector of pixels by a dictionary compression method.

A method for digital image compression of a raster image is disclosed which pre-orders the raster data from a scan line ordering to a vector ordering. This vector ordering takes advantage of the two dimensional correlation that occurs in most raster documents. Pre-ordering the raster data in this method improves compression and reduces the requirements on the size of the history buffer. The additional step of pre-ordering the raster data is a simpler operation of copying data and does not require specialized memory such as CAM. Software implementations are improved by not having to search and pattern match on a larger history buffer.

These and other aspects of the invention will become apparent from the following descriptions to illustrate an embodiment of the invention read in conjunction with the accompanying drawings in which.

Figure 1:
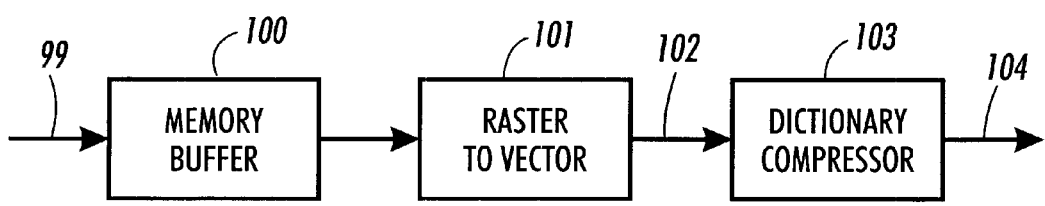
FIG. 1 illustrates the inventive compression method.

Referring now to the drawings, where the showings are for the purpose of illustrating the invention and not limiting same, the term "vector ordered" will refer to ordering specified by this invention. "Scan line ordered" will refer to pixels that are ordered in a memory system or transmission channel such that pixels are in raster scan line sequence. "Pixel one" of "scan line one" is first in the raster scan line sequence, "pixel two" of "scan line one" is next, with the order repeated until scan line one is sent or read. The next and subsequent scan lines are ordered in the same sequence. This is a normal ordering used for storing or sending raster images. The Tag Image File Format (TIFF) is one well known example of a file format that uses this pixel ordering and there are many other examples of this scan line ordering in image formats and systems.

Figure 4:
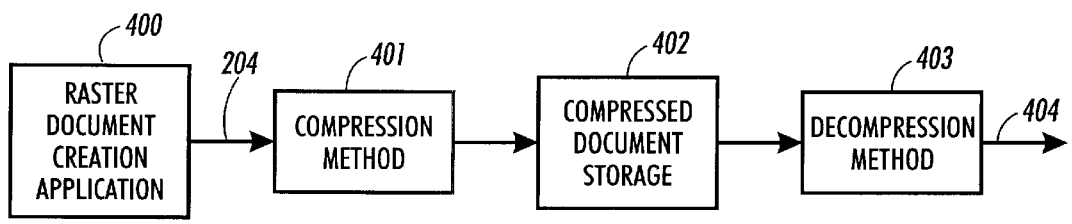
FIG. 4 shows a system in which the present invention may find application.

FIG. 4 shows an environment in which the invention may be used. A raster document creation application 400 generates a scan line raster format document at 204. The raster document creation application may be a raster editor or a system that converts a page description language document into a raster format, for example. Scan line raster data is sent to compression method 401 for compression. Output of compression method 401 is stored in compressed format 402. To regenerate the scan line raster format of the document, decompression method 403 processed the compressed data that was generated by compression method 401. Scan line raster data at locations 204 and 404 are the same in the case where the compression method in 401 is lossless.

FIG. 1 shows a diagram of the functions of the invention. Compression system receives scan line ordered raster data at input 99. This data is organized scan line order such that each pixel of a complete scan line is in raster scan sequence in the input stream and stored in memory buffer 100 in that order. Memory buffer 100 is included in the figure for clarity and is not typically a separate element that has to be added to implement this invention in embodiments. In most embodiments of this invention the raster data is already stored in a memory in raster scan line order as part of creation or capture of the raster data. Raster ordered pixel data is then read from memory buffer 100 and pre-ordered into a vector format in raster to vector function 101. This vector ordered pixel data 102 is sent to a dictionary compression method 103. Vector ordered pixel data is compressed and is either stored or further processed 104.

Figure 2:
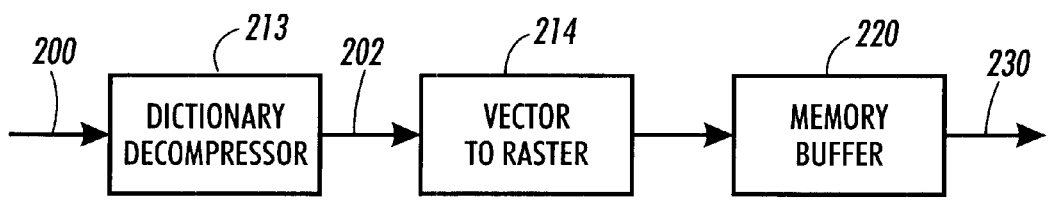
FIG. 2 illustrates the inventive decompression method.

FIG. 2 shows a diagram of the functions of the decompression method of this invention. Compressed data received at decompression input 104 is directed to a dictionary decompression method 213. The output of decompression is vectored ordered pixel data at line 202. Vector ordered data is reordered by the vector to raster function 214. Scan line ordered raster pixel data is then stored in memory buffer 220 which can be further processed or directed onward at output 230.

Figure 3:
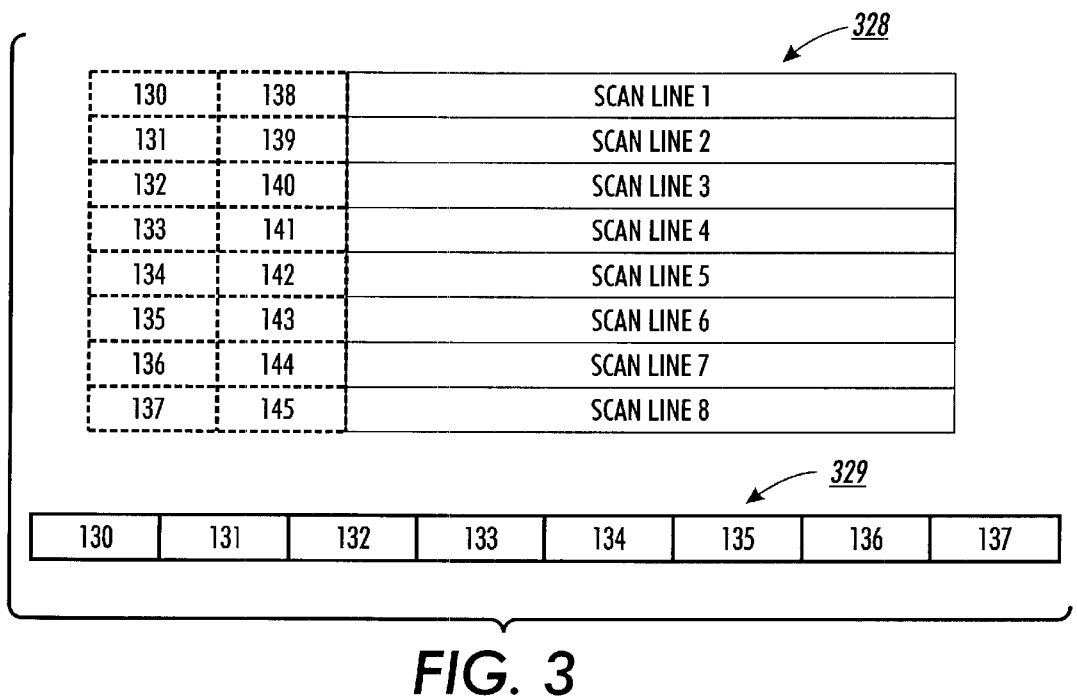
FIG. 3 illustrates the specific ordering method.

FIG. 3 shows a diagram of the specific ordering of raster data that would be implemented in FIG. 1, raster to vector function 101, or in FIG. 2, vector to raster function 214. Scan line ordered data 328 is stored in memory such that sequential memory addresses will access pixels for scan line 1, then scan line 2, and so on. In FIG. 3, eight scan lines are shown as a embodiment, other numbers of scan lines are also possible. Pixel data is vector ordered as shown by 329. The method reads pixel data 130 from scan line 1, which becomes first pixels of the vector 329. In the embodiment, this pixel data 130 is a small portion of a scan line, 8 pixels. Next, pixel data 131 from scan line 2 is copied which becomes the second set of pixels in vector 329. The process of copying is repeated for 132–137 to create a vector that is used as input to a dictionary compressor. Next the complete copying process is repeated for segments 138–145, and then repeated for the rest of the raster data contained in the scan lines in the memory buffer. Using this method of ordering, all the raster data from the scan lines are sent to the dictionary compression method and compressed. Once all the pixels of the scan lines have been ordered in this method, further scan lines of the image can be processed in the same procedure.

The specific ordering of this vector of pixels takes advantage of correlation of the pixel data at scan line intervals. Pre-ordering of raster data by this specific method results in improved compression and reduces size requirements of the history buffer that has to be searched. To demonstrate improvements made by the invention embodiments of the invention were developed and sample documents were compressed with and with out the invention. The sample documents included a document composed of text and another composed of mixed text and graphics object types. These documents were chosen to represent a range of raster data and complexity. Two of the embodiments differed by the method of dictionary-based compression used (dictionary compressor 103 in FIG. 1). The dictionary compression methods were chosen to show how the invention can be used with, and show improvements with different implementations of dictionary compression. Both embodiments used the invention to produce the results illustrated by the "Vector" row in the tables, and use a standard scan line ordered method, to produce the results illustrated by the "Scan line" row in the tables.

The embodiment whose results are shown in Table 1, used a dictionary compression method named "StarLite" available from Advanced Hardware Architectures, 2365 NE Hopkins Court. Pullman, Wash. 99163-5601. From data in table 1, the compression ratio, defined as the ratio of the input file size divided by output data file size is higher (I or shows improved compression) with vector ordering for the same input data.

TABLE 1

| Document | Pixel Ordering | Compression Ratio |
|---|---|---|
| Text | Vector | 29.38 |
| | Scan line | 22.27 |
| Mixed Text and Graphics | Vector | 17.39 |
| | Scan line | 11.67 |

The embodiment whose results are shown in Table 2 used a sliding window dictionary compression method implementation that allowed a choice of history window size. The two documents were compressed with three different history window sizes {1024, 2048, 4096 pixels}. Table 2 shows an improvement in compression ratio for implementations that use the vector ordering, as compared to standard scan line ordering. In addition, for vector reordering of the pixels, the compression ratio was less dependent on window size. In the case of more complex document content (mixed text and graphics), the vector ordering method achieved better compression with a smaller window in this implementation of the dictionary compression method.

TABLE 2

| Raster Document | History Window Size | Pixel Ordering | Compression Ratio |
|---|---|---|---|
| Text | 1024 pixels | Vector | 44.81 |
| | | Scan line | 42.03 |
| | 2048 pixels | Vector | 47.71 |
| | | Scan line | 42.39 |
| | 4096 pixels | Vector | 51.10 |
| | | Scan line | 42.91 |
| Mixed text and graphics | 1024 pixels | Vector | 20.51 |
| | | Scan line | 11.38 |
| | 2048 pixels | Vector | 19.96 |
| | | Scan line | 11.23 |

TABLE 2-continued

| Raster Document | History Window Size | Pixel Ordering | Compression Ratio |
|---|---|---|---|
| | 4096 pixels | Vector | 19.27 |
| | | Scan line | 11.04 |

The disclosed method may be readily implemented in software using object oriented software development environments that provide portable source code that can be used on a variety of computer or workstation hardware platforms. Alternatively, the disclosed image processing system may be implemented partially or fully in hardware using standard logic circuits or specifically on a single chip using VLSI design. Whether software or hardware, or combinations there of, is used to implement the system varies depending on the speed and efficiency requirements of the system and also the particular function and the particular software or hardware systems and the particular microprocessor or microcomputer systems being utilized. The image processing system, however, can be readily developed by those skilled in the applicable arts without undue experimentation from the functional description provided herein together with a general knowledge of the computer arts.

What is claimed is:

1. A method of compressing raster image comprising:

receiving scan ordered raster data;

ordering the raster data into a vector of pixels that are taken from several scan lines;

compressing the vector of pixels by a dictionary compression method.

2. A method of decompressing raster image comprising:

receiving vector ordered data;

decompressing the vector ordered data by a dictionary compression method;

ordering the vector data into a raster data for plural scan lines.

* * * * *